(12) United States Patent
Baldwin et al.

(10) Patent No.: US 6,936,791 B1
(45) Date of Patent: Aug. 30, 2005

(54) THERMAL STORAGE AND TRANSPORT

(75) Inventors: Wayne D. Baldwin, Asheboro, NC (US); Fujio Abe, Greensboro, NC (US)

(73) Assignee: Vesture Acquisition Corporation, Asheboro, NC (US)

( * ) Notice: Subject to any disclaimer, the term of this patent is extended or adjusted under 35 U.S.C. 154(b) by 353 days.

(21) Appl. No.: 09/526,026

(22) Filed: Mar. 15, 2000

Related U.S. Application Data

(63) Continuation of application No. 09/204,013, filed on Dec. 1, 1998, which is a continuation of application No. 08/706,651, filed on Sep. 6, 1996, now Pat. No. 5,892,202.

(51) Int. Cl.[7] ............................. A21B 1/52; H05B 3/22; A47L 36/24
(52) U.S. Cl. ........................................ 219/387; 219/521
(58) Field of Search ................................ 219/387, 521; 165/104.11; 126/400

(56) References Cited

U.S. PATENT DOCUMENTS

| | | |
|---|---|---|
| 1,439,094 A | 12/1922 | Gingras |
| 1,558,278 A | 10/1925 | Phillips |
| 2,114,396 A | 4/1938 | McFarlan et al. |
| 2,298,299 A | 10/1942 | Joy et al. |
| 2,479,268 A | 8/1949 | Sarria |
| 2,584,302 A | 2/1952 | Stern |
| 2,980,881 A | 4/1961 | McKee |
| 3,017,493 A | 1/1962 | Cooke |
| 3,079,486 A | 2/1963 | Winchell |
| 3,084,241 A | 4/1963 | Carrona |
| 3,202,801 A | 8/1965 | Saluri |
| 3,273,634 A | 9/1966 | Snelling |
| 3,292,628 A | 12/1966 | Maxwell et al. |
| 3,549,861 A | 12/1970 | Trachtenberg et al. |
| 3,596,059 A | 7/1971 | Hager, Jr. |
| 3,665,939 A | 5/1972 | Laing |
| 3,721,803 A | 3/1973 | DiStefano |
| 3,739,148 A | 6/1973 | Ryckman, Jr. |
| 3,780,262 A | 12/1973 | Rudd |
| 3,805,018 A | 4/1974 | Luong et al. |
| 4,035,606 A | 7/1977 | Browder |
| 4,134,004 A | 1/1979 | Anderson et al. |
| 4,147,921 A | 4/1979 | Walter et al. |
| 4,198,559 A | 4/1980 | Walter et al. |
| 4,199,021 A | 4/1980 | Thoma |
| 4,201,218 A | 5/1980 | Feldman et al. |
| 4,335,725 A | 6/1982 | Geldmacher |
| 4,528,439 A | 7/1985 | Marney, Jr. et al. |
| 4,561,441 A | 12/1985 | Kolodziej |

(Continued)

FOREIGN PATENT DOCUMENTS

EP     0 001 151 A3     3/1979

(Continued)

*Primary Examiner*—Joseph Pelham
(74) *Attorney, Agent, or Firm*—Merchant & Gould P.C.

(57) ABSTRACT

The carrying case for storing and transporting heated articles includes a thermal storage assembly having a heat retention member for absorbing and retaining sensible heat and for releasing the sensible heat of a extended period time. The thermal storage assembly includes a heating coil assembly secured to a surface of the heat retention member. The heating coil assembly includes a resistive heating coil disposed adjacent to the heat retention member. The heating coil has a power cord connected to the coil with the coil being retained within a sealed thermally conductive pouch.

27 Claims, 4 Drawing Sheets

U.S. PATENT DOCUMENTS

| | | | |
|---|---|---|---|
| 4,578,814 A | 3/1986 | Skamser | |
| D287,921 S | 1/1987 | Skamser | |
| 4,672,178 A | 6/1987 | Wada et al. | |
| 4,702,235 A | 10/1987 | Hong | |
| 4,743,726 A | 5/1988 | Hughes et al. | |
| 4,777,346 A | 10/1988 | Swanton, Jr. | |
| 4,777,930 A * | 10/1988 | Hartz | 126/400 |
| 4,802,233 A | 1/1989 | Skamser | |
| 4,806,736 A | 2/1989 | Schirico | |
| 4,816,646 A | 3/1989 | Solomon et al. | |
| 4,817,704 A | 4/1989 | Yamashita | |
| 4,868,898 A | 9/1989 | Seto | |
| 4,894,931 A | 1/1990 | Senee et al. | |
| 4,904,846 A | 2/1990 | Oscadal | |
| 4,916,290 A | 4/1990 | Hawkins | |
| 4,920,964 A | 5/1990 | Francis, Jr. | |
| 4,929,094 A | 5/1990 | Becker | |
| 4,933,534 A | 6/1990 | Cunningham et al. | |
| 4,979,923 A | 12/1990 | Tanaka | |
| 4,983,798 A | 1/1991 | Eckler et al. | |
| 5,009,228 A | 4/1991 | Clark | |
| 5,050,595 A | 9/1991 | Krafft | |
| 5,052,369 A | 10/1991 | Johnson | |
| 5,062,414 A | 11/1991 | Grim | |
| 5,078,050 A | 1/1992 | Smith | |
| 5,128,522 A | 7/1992 | Marx et al. | |
| 5,150,707 A | 9/1992 | Anderson | |
| 5,151,578 A | 9/1992 | Phillips | |
| 5,159,177 A | 10/1992 | Kinberger | |
| 5,184,725 A | 2/1993 | Reinheimer et al. | |
| 5,211,949 A | 5/1993 | Salyer | |
| 5,300,105 A | 4/1994 | Owens | |
| 5,314,005 A | 5/1994 | Dobry | |
| 5,329,096 A | 7/1994 | Suematsu | |
| 5,336,255 A | 8/1994 | Kanare et al. | |
| 5,339,541 A | 8/1994 | Owens | |
| 5,357,693 A | 10/1994 | Owens | |
| 5,404,808 A | 4/1995 | Smith et al. | |
| 5,405,671 A | 4/1995 | Kamin et al. | |
| 5,408,068 A * | 4/1995 | Ng | 219/521 |
| 5,424,519 A | 6/1995 | Salee | |
| 5,454,471 A | 10/1995 | Norvell | |
| 5,470,002 A | 11/1995 | DiStefano et al. | |
| 5,551,615 A | 9/1996 | McIntosh | |
| 5,750,962 A | 5/1998 | Hyatt | |
| 5,880,435 A | 3/1999 | Bostic | |
| 5,884,006 A | 3/1999 | Frohlich et al. | |
| 5,892,202 A | 4/1999 | Baldwin et al. | |
| 5,932,129 A | 8/1999 | Hyatt | |
| 5,999,699 A | 12/1999 | Hyatt | |
| 6,018,143 A | 1/2000 | Check | |

FOREIGN PATENT DOCUMENTS

| | | |
|---|---|---|
| EP | 0 130 478 A | 1/1985 |
| GB | 2 054 348 A | 2/1981 |
| GB | 2 160 965 A | 1/1986 |
| GB | 2 195 015 A | 3/1988 |
| GB | 2 255 170 | 10/1992 |
| GB | 2 272 969 A | 6/1994 |
| JP | 57-96978 | 6/1982 |
| JP | 62-241287 | 10/1987 |
| WO | WO 87/06803 | 11/1987 |

* cited by examiner

THERMAL STORAGE AND TRANSPORT

This application is a Continuation of application Ser. No. 09/204,013, filed Dec. 1, 1998, which is a Continuation of application Ser. No. 08/706,651, filed Sep. 6, 1996, now U.S. Pat. No. 5,892,202 which application(s) are incorporated herein by reference.

I. BACKGROUND OF THE INVENTION

1. Field of the Invention

This invention pertains to an apparatus for storing and transporting heated articles to provide a delayed discharge of heat to the article during transportation or storage. More particularly, this invention pertains to an apparatus for retaining a level of heat in a food product being transported or stored.

2. Description of the Prior Art

Food products (such as pizza) are frequently prepared and cooked at a store location. The prepared products are then delivered to a customer at a home or place of business.

A heated food product may be stored at the store location awaiting a delivery person's transportation of the food product to the customer. During both the storage and the transportation, the product may lose its sensible heat.

In the event of heat loss, a product may become unacceptable to a consumer. As a result, effort is made to retain the heat of the product after its cooking preparation.

In pizza delivery, it is common to prepare a pizza and store it in individual cardboard boxes. The cardboard boxes are then placed under heat lamps awaiting pickup by a delivery person. The delivery person then stores the cardboard containers in a thermally insulated carrying case for delivery to the home owner.

The use of heat lamps for providing additional heat during storage and the use of thermally insulated carrying cases have improved the heat level of the product finally delivered to the consumer. However, it is still desirable to find a means for enhancing the heat level of the final product delivered to the consumer.

II. SUMMARY OF THE INVENTION

According to a preferred embodiment to the present invention, a transport device is disclosed including a container having an interior volume for receiving a heated product. Disposed within the container is a heat transfer article having a thermal mass exposed in heat transfer relation to an electrically resistive coil. A power cord connects the coil to a source of electrical energy.

III. BRIEF DESCRIPTION OF THE DRAWINGS

IV. DETAILED DESCRIPTION OF THE PREFERRED EMBODIMENT

With reference now to the various figures in which identical elements are identically numbered throughout, a description of the preferred embodiment of the present invention will now be provided. The present invention will be described with reference to a container for storing and transporting heated food articles. In particular, the present invention will be described with reference to a pouch for storing and transporting pizza which is cooked and placed in individual cardboard boxes as is customary. While the invention is being disclosed in a preferred embodiment, it will be appreciated that the invention can be used in a wide variety of applications for storing or transporting heated articles where it is desired to maintain the heated articles at an elevated temperature relative to ambient temperature.

Figure 1:
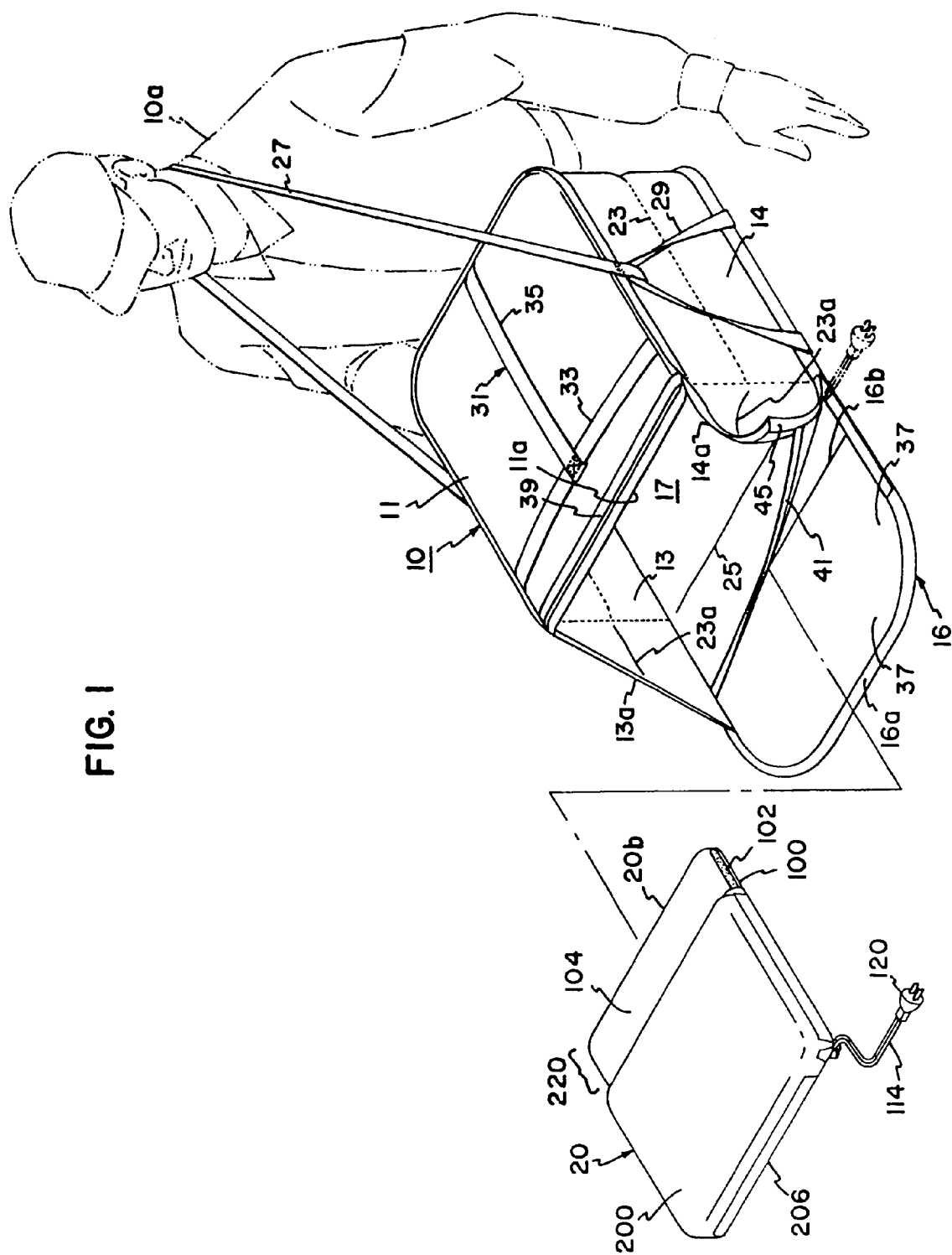
FIG. 1 is a perspective view of a thermal storage and transport device according to the present invention shown in an embodiment adapted for pizza delivery and shown used in one mode of use.
Figure 2:
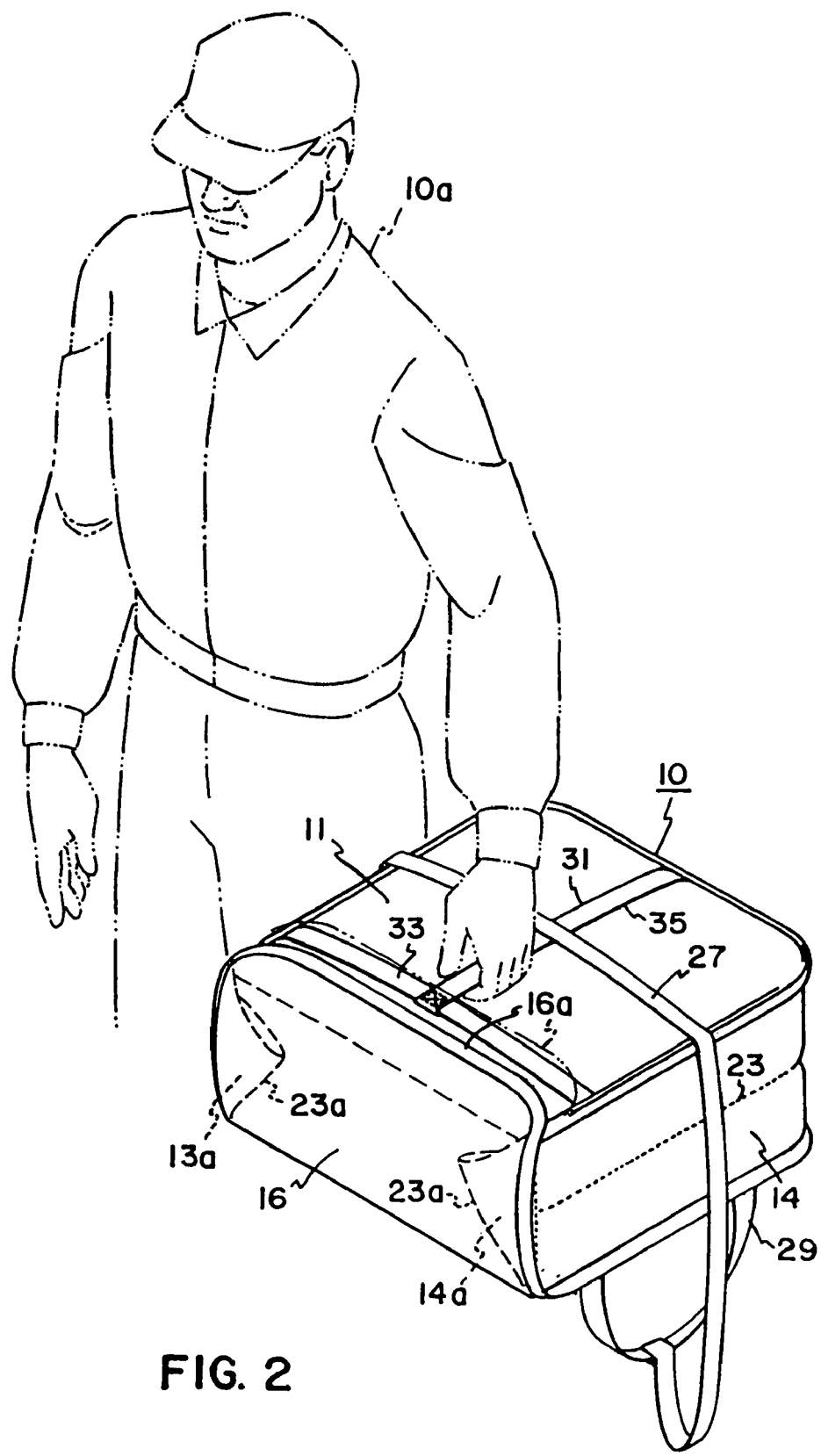
FIG. 2 is the view of FIG. 1 illustrating an alternate mode of use.
Figure 3:
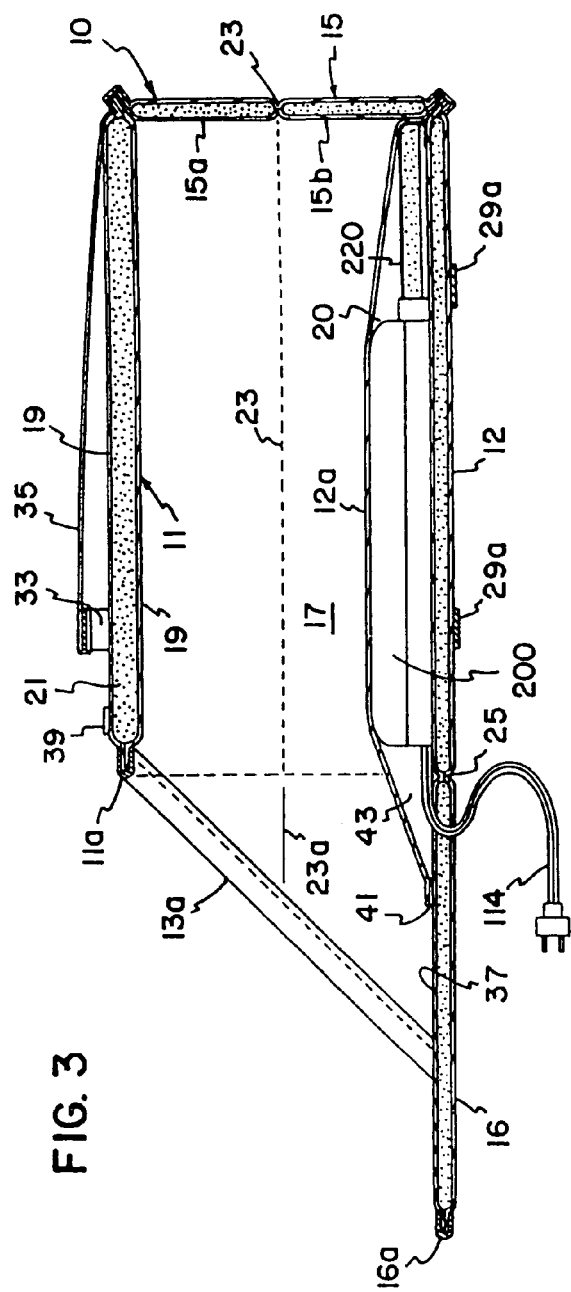
FIG. 3 is a cross-sectional longitudinal view of the device of FIG. 1.

With reference to FIGS. 1–3, a carrying pouch or case 10 is shown having a top wall 11, bottom wall 12, side walls 13, 14, rear wall 15, and front flap or cover 16. The walls 11–15 and flap 16 are formed of soft, pliable fabric layers 19 with thermal insulation 21 contained between the layers 19.

The flap 16 opens to expose a pouch interior 17. The pouch interior 17 is sized to receive a plurality of cardboard boxes each containing individual pizzas with the cardboard boxes stacked on top of one another. It will be appreciated that pouches 10 thus described for containing pizzas and formed of insulative lining form no part of this invention per se and are well known in the prior art. The rear wall 15 includes vent holes (not shown) for venting moisture from the interior 17.

The improved pouch 10 includes novel features for enhancing the thermal retention capabilities of the pouch 10 and for carrying. Side walls 13, 14 and rear wall 15 are formed in two insulated segments (such as segments 15a, 15b in FIG. 3) separated by a stitch line 23. Line 23 runs longitudinally along the midpoint of the height of walls 13–15 to permit the height of pouch 10 to be collapsed. Flap 16 is flexible along its length and is hinged to bottom wall 12 at a stitch line 25. For carrying, the pouch 10 includes an elongated strap 27 terminating at both ends at an inverted V-shaped strap 29. Strap 27 is secured to the apex of the V-shaped strap 29. The V-shaped straps 29 are positioned opposite both sidewalls 13, 14 (although only strap 29 opposite sidewall 14 is shown in FIG. 1). For weight distribution, the ends of V-shaped straps 29 are positioned on opposite sides of the mid-points of side walls 13, 14. The straps 29 are joined by strap segments 29a running parallel along the underside of bottom wall 12 (FIG. 3) and stitched to wall 12 such that the load on strap 27 is divided along V-shaped straps 29 and distributed along the bottom wall 12. Strap 27 is sized to fit around the neck of a delivery person 10a with rear wall 15 facing and abutting the waist of the delivery person 10a (FIG. 1).

Pouch 10 also includes a hand strap 31 shown in use in FIG. 2. Strap 31 includes a transverse strap 33 stitched to the intersection of sidewalls 13, 14 and top wall 11. Strap 31 also includes a longitudinal strap 35 stitched to the midpoint of strap 33 and to the midpoint of the intersection of rear wall 15 and top wall 11.

It will be noted that the flap 16 includes an area 37 of a hook and loop fastener (sold under the trademark Velcro) on the inner surface of flap 16 from its leading end 16a to a termination line 16b adjacent hinge 25. The Velcro fastener 37 secures to a mating Velcro fastener 39 disposed on a forward end of the upper wall 11. Accordingly, flap 16 may be folded over from an open position (shown in FIGS. 1 and 3) to a closed position (FIG. 2) with the Velcro fasteners 37, 39 secured to one another in order to secure the flap 16 in a closed position. Since area 37 is larger than Velcro strip 39, the flap 16 can be secured to strip 39 at any one of a number of closed positions. For example, FIG. 2 shows flap 16 secured to top wall 11 in one position (illustrated by the position of leading end 16a in solid lines). The phantom line 16a shows flap 16 extended over top wall 11 to partially cover top wall 11 to accommodate a smaller number of articles within pouch 10.

The wide walls 13, 14 include triangular gusset flaps 13a, 14a, which vary from a maximum thickness at the leading end 11a of the upper wall 11 to a minimum thickness at leading end 16a of the flap 16. The side flaps 13a, 14a include folds 23a such that as the flap 16 is moved to the closed position, the folds 23a cause the flaps 13a, 14a to fold inwardly and cover side openings to the interior 17 (as illustrated in FIG. 2). The side flap 14a is secured to flap 16 by a Velcro fastener 45 for reasons that will become apparent. Accordingly, when the flap 16 is moved to the closed position, the side flaps 13a, 14a cover the openings and prevent air from passing from the interior 17 out of the pouch 10. This is an enhancement over prior art pouches 10 which did not include such flaps. In the prior art, when the forward flap was moved to a closed position, opposing surfaces of the forward flap and the side walls of the prior art pouches defined a large opening for air to flow from the interior of the pouch to the exterior of the pouch.

The bottom wall 12 includes a cover 12a disposed within the interior 17. The cover 12a is disposed in parallel overlying relation to the interior of the bottom wall 12. Cover 12 extends beyond hinge 25 (as illustrated in FIG. 3) and terminates at a Velcro strap 41 for sealing attachment to area 37.

The cover 12a defines a separate interior volume (or sub-chamber) 43 which is accessible through an opening at a leading end of the cover 12a. Chamber 43 is sized to receive a thermal pack assembly 20. The thermal pack assembly 20 includes a rigid base 100 which is preferably formed of wood or other non-thermally conductive materiel with the base 100 sized to be received within the chamber 43 and substantially fill the chamber 43 with the base 100 being parallel to cover 12a. The thermal pack assembly 20 further includes a thermally insulating foam cushion 102 disposed on an upper surface of the base 100 with the foam cushion 102 substantially covering base 100 and secured thereto through any suitable means such as adhesive or the like. An upper surface of the foam cushion 102 is provided with a foil cover 104 which is a thermally conductive metal foil completely covering the upper surface of the foam cushion 102.

Figure 4:
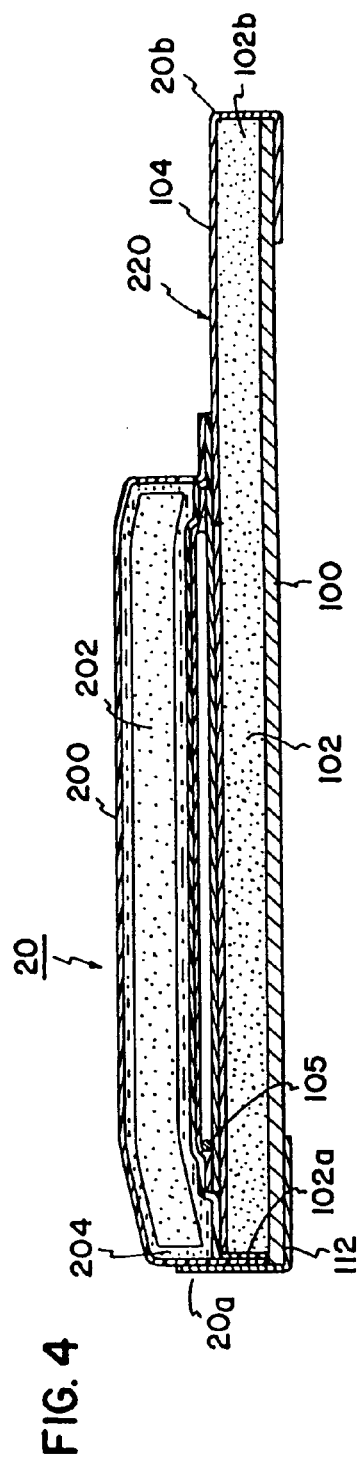
FIG. 4 is a cross-sectional longitudinal view of a novel thermal pack assembly for use in the device of FIG. 1.
Figure 5:
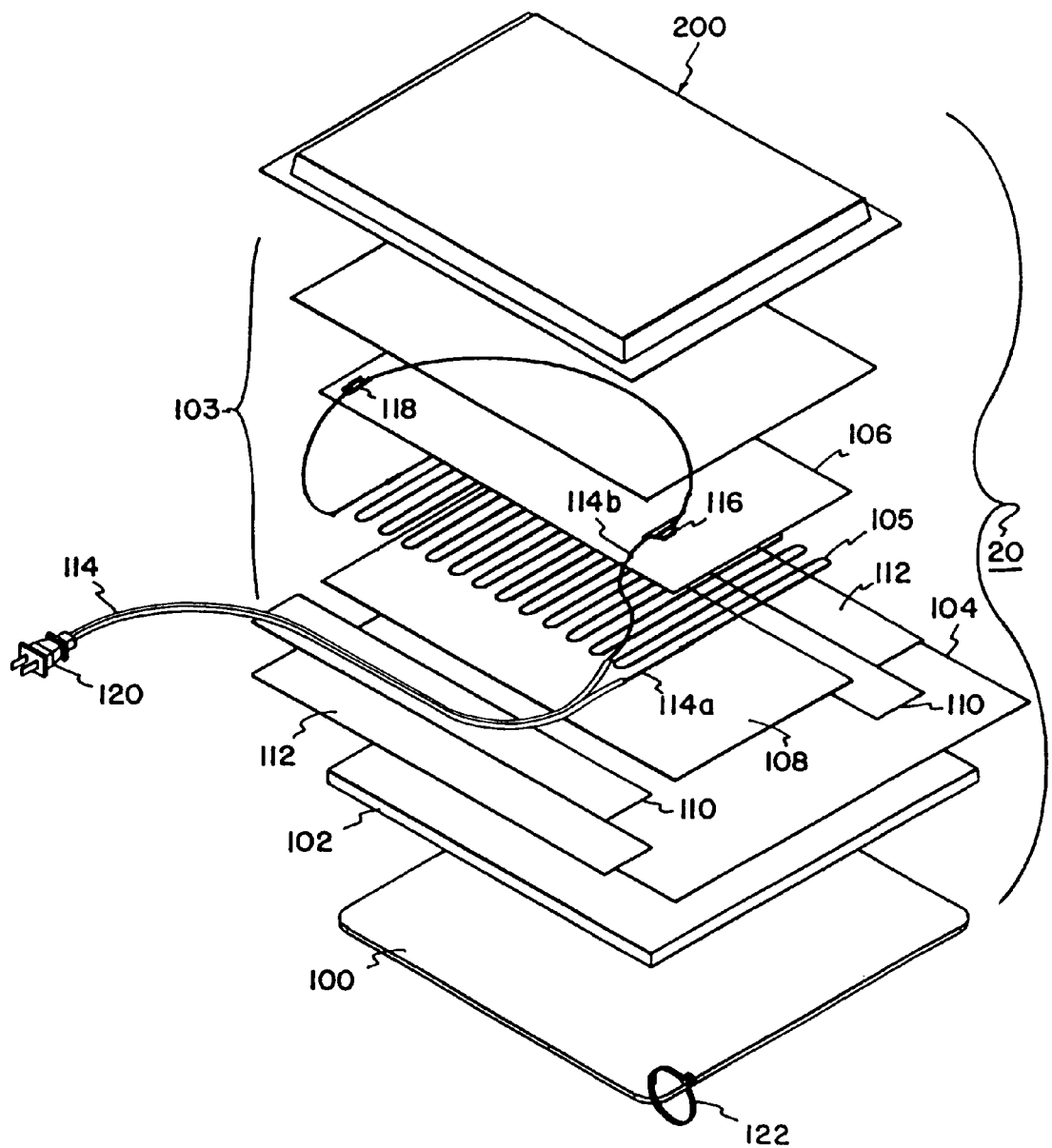
FIG. 5 is an exploded perspective view of the thermal pack assembly of FIG. 4.

As shown in FIG. 5, a heating coil subassembly 103 includes an electrically resistive heating coil 105 disposed in a generally rectangular plane. The heating coil 105 is sandwiched between two thermally conductive metal foils 106, 108. The foils 106, 108 are sealed by metallic tape 110 (not shown in FIG. 4) so that liquid such as water or other undesirable elements cannot be admitted into contact with the coil 105. Aluminum tape 112 secures the subassembly 103 to the foil layer 104 and base 100.

The subassembly 103 includes a power cord 114 having a neutral and an energized conductor 114a, 114b. The neutral conductor 114a is connected to one end of the coil 105. The energized conductor 114b is connected to an opposite end of the coil 105. The energized conductor 114b includes first and second thermostats 116, 118 connected in series with the coil 105. The cord 114 terminates at a conventional wall outlet plug 120 such that the coil 105 can be connected to an AC source of electrical power simply by inserting the plug 120 within a wall outlet. A plastic clip 122 secures the cord 114 to base 100.

The subassembly 103 is secured to the underside of a thermal retention pouch 200. The pouch 200 is secured to subassembly 103 and base 100 by metallic tape 112.

The thermal retention pouch 200 is a completely sealed envelope of plastic in which is contained an open cell foam pad 202. The foam pad is impregnated with water 204 contained within the pouch 200. The pouch 200 is partially evacuated during formation. As a result of this assembly, when the coil 105 is energized and distributes heat, the heat is passed into the pouch 200 and the water temperature within the pouch 200 is elevated. The water 204 retains the heat to later slowly release the heat over time as sensible energy when the cord 114 is disconnected from a power source. It will be appreciated that a pouch 200 thus described forms no part of this invention per se. An example of such is shown in commonly assigned U.S. Pat. Nos. 5,357,693 and 5,500,010.

Having thus generally described the structure of the present invention, it will be noted that the pouch 200 and resistive heating element 105 have substantially equal surface areas such that the resistive heating element 105 produces heat along the entire undersurface of the pouch 200. The upper foil 106 distributes heat evenly from the coil 105 to the undersurface of the pouch 200 to prevent localized overheating. Overheating is also avoided through thermostats 116, 118. The first thermostat 116 is selected to open at 100° C.±5° C. The second thermostat 118 is selected to open at 105° C.±5° C. Accordingly, the second thermostat 118 acts as a safety override in the event of failure of the first thermostat 116. The coil 105 is shown in serpentine geometry. The coil 105 preferably has a length of about 18 feet with a resistance of about 5.6 ohms per foot.

In addition to transmitting heat to the pouch 200, the coil 105 transmits heat to the bottom foil 104 covering foam 102. Accordingly, when the plug 120 is inserted within a wall outlet, the coil 105 begins heating. Heat from the coil 105 is distributed to both the pouch 200 and to the foil 104.

The thermal pack assembly 20 includes its various elements being sized such that the surface area of the pouch 200 and coil 105 are smaller than the surface area of the foam pad 102 and base 100. While the pouch 200 and coil 105 have a width approximately equal to the width of the foam pad 102, their length is substantially smaller than the foam pad 102. The pouch 200 and electrical grid 105 are positioned in overlying relation to the foam pad 102 at a leading end 102a to provide an area 220 of pad 102 and foil 104 towards the trailing end 102b of the foam pad 102 which is not covered by the pouch 200 and the coil 105. Accordingly, during periods of time when either the coil 105 is being heated or the pouch 200 is releasing heat, the leading end 20a of the thermal pack assembly 20 will be hotter than the trailing end 20b.

As shown in FIG. 3, the thermal pack assembly 20 is placed within the chamber 43 with the trailing end 20b of the thermal pack assembly 20 positioned toward the rear wall 15 of the pouch 10. As a result, the greatest source of sensible heat is at the forward end 20a of the thermal pack 20 adjacent the flap 16. This is done recognizing that the greatest heat loss is through the forward end of the pouch 10 due to the presence of the flap 16. The combination of placing the thermal pack 20 near the front end of the flap 16 and providing the flap 16 with side flaps 13a, 14a provides the greatest amount of heat at the forward end plus enhances the structure of the pouch 10 to retain heat at the forward end.

The foil 104 covering the foam pad 102 transmits heat from the front end 20a of the assembly 20 towards the rear end 20b of the assembly 20. Accordingly, heat can radiate off of the foil 104 at the area 220 of the rear end of the assembly 20 to heat articles within chamber 17 positioned above the trailing end 20b of the assembly 20. The cord 114 is secured to plastic strap 122 (FIG. 5) to provide a strain relief such that a worker pulling on the cord 114 cannot dislodge the cord 114 from the grid 105.

With the structure thus described, the apparatus can be used in a pizza shop by inserting the plug 120 within a wall outlet. This energizes the coil 105 to transmit heat to the pouch 200 and thereby store heat within the pouch 200. Furthermore, the heat from the coil 105 is distributed to the interior 17 of the pouch 10 along the length and width of foil 104. As a result, pizza can be formed, cooked and placed in individual cardboard boxes as is conventional. The filled cardboard boxes can then be placed within the chamber 17 awaiting pickup by a delivery person without the need for application of additional energy through external heating lamps as was required in the prior art.

When a delivery person desires to deliver the pizzas, he simply unplugs the cord 114 from the outlet and transports the entire pouch 10 containing the pizza packages. After the cord 114 is unplugged, additional energy is not being provided to the coil 105. Instead, the pouch 10 is releasing its stored energy to retain the pizza at a desired elevated temperature throughout transportation. During the storage phase, the flap 16 can be closed since the cord 114 may be passed between the Velcro fasteners 37, 41 of the side wall flap 14a. As a result, the flaps 13a, 14a retain as much heat as possible within the interior 17.

Various enhancements can be made to the present invention to improve its operation. For example, fluid may be lost through the walls of the plastic of the pouch 200 through time. Vapor can simply pass through the micropores of the plastic wall. To avoid such loss of fluid, metal can be vacuum deposited on the plastic to further seal the plastic and prevent vapor loss through the plastic. This improves the duration and life of the pouch 200. The bottom foam layer 102 provides thermal insulation to the base 100 to ensure that as much heat as possible rises upwardly into the chamber 17 to heat the pizza. The bottom board or base 100 is rigid to improve the carrying capability of the pouch for a delivery person.

While the preferred embodiment illustrates the use of water 204 within the pouch 200 as is conventional, the heat sink could be a dielectric oil such as mineral oil or the like. Such oils are not electrically conductive. Further, such oils have higher vapor pressures and can be heated to higher temperatures without risk of bursting of the pouch 200. Such oils do not corrode metals and are non-toxic. Also, a phase change material can be used in pouch 200 to store energy as the latent heat of the phase change.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A phase change thermal storage assembly, comprising:
    a container assembly having first and second sides and an internal volume between the first and second sides;
    a layer of phase change material in said internal volume, said phase change material being chargeable with heat energy; and
    a heater assembly positioned on one side of the layer of phase change material to charge the phase change material in the internal volume with heat energy and distribute heat evenly to the phase change material in the internal volume during charging of the phase change material, wherein the heater assembly comprises a heating element, and the heating element comprises an electrically resistive heating coil.

2. A phase change thermal storage assembly according to claim 1, wherein the heater assembly includes a heat transfer element to distribute heat from the heating element to the phase change material during charging of the phase change material.

3. A phase change thermal storage assembly according to claim 2, wherein the heat transfer element is disposed between the heating element and said layer of phase change material.

4. A phase change thermal storage assembly according to claim 3, wherein the heat transfer element is thermally conductive metal foil.

5. A phase change thermal storage assembly according to claim 1, further comprising a supporting element for the layer of phase change material.

6. A phase change thermal storage assembly according to claim 5, wherein the supporting element is an open cell foam.

7. A phase change thermal storage assembly according to claim 1, wherein the heating element includes a thermostat.

8. A phase change thermal storage assembly according to claim 1, wherein the heater assembly has a heat transfer element to charge the phase change material in the internal volume with heat energy and distribute heat evenly to the phase change material in the internal volume during charging of the phase change material.

9. A food heating device, comprising a pouch and a phase change thermal storage assembly removably positioned in the pouch, said phase change thermal storage assembly, comprising:
    a container assembly having first and second sides and an internal volume between the first and second sides;
    a layer of phase change material in said internal volume, said phase change material being chargeable with heat energy; and
    a heater assembly positioned on one side of the layer of phase change material to charge the phase change material in the internal volume with heat energy and distribute heat evenly to the phase change material in the internal volume during charging of the phase change material.

10. A food heating device according to claim 9, wherein the heater assembly includes a heating element to charge the phase change material with heat energy and a heat transfer element to distribute heat from the heating element to the phase change material during charging of the phase change material.

11. A food heating device according to claim 10, wherein the heat transfer element is disposed between the heating element and said layer of phase change material.

12. A food heating device according to claim 11, wherein the heat transfer element is a thermally conductive metal foil.

13. A food heating device according to claim 9, further comprising a supporting element for the layer of phase change material.

14. A food heating device according to claim 13, wherein the supporting element is an open cell foam.

15. A food heating device according to claim 9, wherein the heater assembly is a heating element.

16. A food heating device according to claim 15, wherein the heating element is an electrically resistive heating coil.

17. A food heating device according to claim 15, wherein the heating element includes a thermostat.

18. A food heating device according to claim 9, wherein the heater assembly has a heat transfer element to charge the phase change material in the internal volume with heat energy and distribute heat evenly to the phase change material in the internal volume during charging of the phase change material.

19. A pizza heater for keeping pizza warm during delivery, comprising:
 a container assembly having first and second sides and an internal volume between the first and second sides;
 a layer of phase change material in said internal volume, said phase change material being chargeable with heat energy; and
 a heater assembly positioned on one side of the layer of phase change material to charge the phase change material in the internal volume with heat energy and distribute heat evenly to the phase change material in the internal volume during charging of the phase change material, wherein the heater assembly comprises a heating element, and the heating element comprises an electrically resistive heating coil.

20. A pizza heater according to claim 19, wherein the heater assembly includes the heating element to charge the phase change material with heat energy and first and second heat transfer elements on opposite sides of said heating element, one of said heat transfer elements distributing heat from the heating element to the phase change material during charging of the phase change material.

21. A pizza heater according to claim 20, wherein one of the heat transfer element is disposed between the heating element and said layer of phase change material.

22. A pizza heater according to claim 21, wherein the heat transfer elements are thermally conductive metal foils.

23. A pizza heater according to claim 19, further comprising a supporting element for the layer of phase change material.

24. A pizza heater according to claim 23, wherein the supporting element is an open cell foam.

25. A pizza heater according to claim 19, wherein the heating element includes a thermostat.

26. A pizza heater according to claim 19, wherein the heater assembly has the heat transfer element to charge the phase change material in the internal volume with heat energy and distribute heat evenly to the phase change material in the internal volume during charging of the phase change material.

27. A pizza heater according to claim 19, further comprising a rigid base having a greater surface area than the resistive heating coil, the container and the resistive heating coil being secured to the base with the resistive heating coil between the base and the container so as to define an uncovered portion of the base, and a thermally conductive material extending over the uncovered portion.

* * * * *